Sept. 22, 1964     T. C. G. WAGNER     3,150,254
COMPARATOR
Filed May 2, 1960
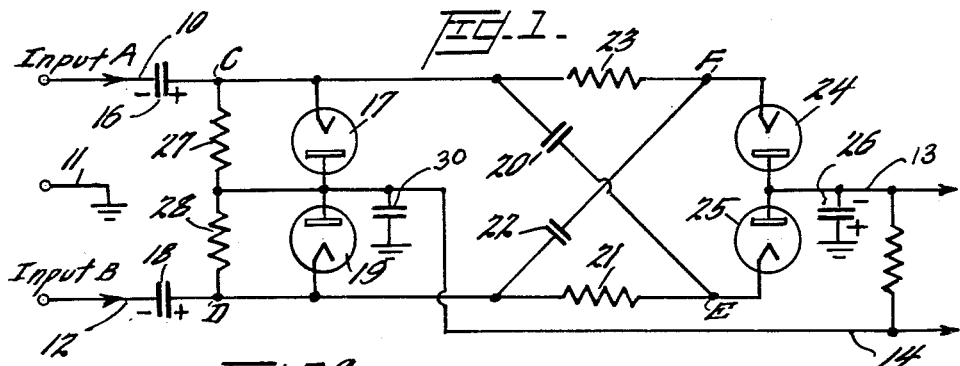
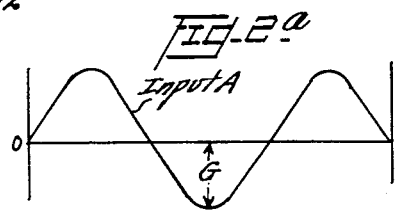
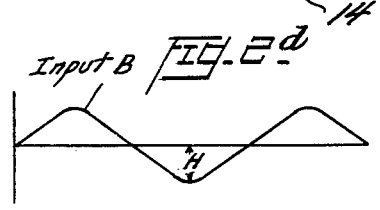
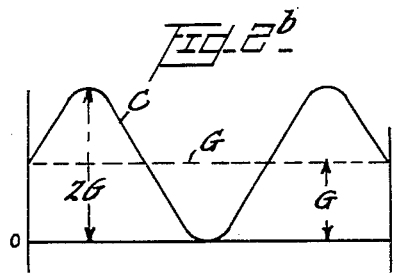
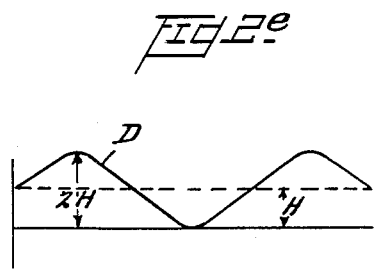
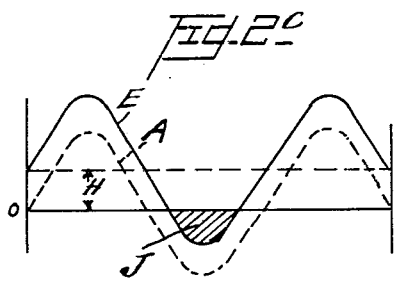
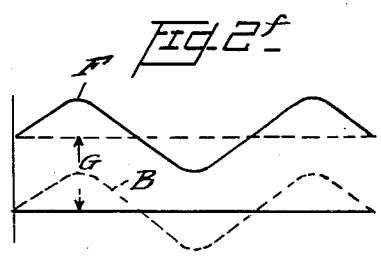
INVENTOR
*Thomas C.G. Wagner,*
BY *Alfred B. Levine*
*Seymour M. Rosenberg*
*Robert H. Lentz*
ATTORNEYS United States Patent Office 3,150,254
Patented Sept. 22, 1964

3,150,254
COMPARATOR
Thomas C. G. Wagner, Rockville, Md., assignor to Litton Systems, Inc., New Rochelle, N.Y.
Filed May 2, 1960, Ser. No. 25,968
9 Claims. (Cl. 235—193)

This invention generally relates to differencing or error circuits for computing, correcting or indicating applications, and is particularly concerned with such circuits for determining the difference in amplitude between two alternating current signals and providing a direct current output signal having a constant polarity but variable amplitude proportion to such difference regardless of which signal may be the larger.

In analog computers, navigational guidance systems and many other applications there exists the need for continuously monitoring two alternating current signals and determining when the amplitudes of such signals differ from one another and the degree of such difference. In many of such applications, particularly in warning systems or the like, it is immaterial which of the two signals falls below the amplitude of the other, but rather it is only necessary to determine when the difference or error becomes sufficiently great that a warning or other indication should be given and corrective measures taken to restore the original conditions. In fact, in many applications it is necessary that the error signal be in direct current form and of constant polarity.

A common approach to solving this problem is to convert each of the alternating signals to direct current form and thereafter obtain the difference between the direct current signals. However, unless it is presupposed that one of the signals will always exceed the other for any difference therebetween, the polarity of the error signal is reversible and additional inverters or discriminators are necessary to insure that the direct current output signal is always of constant polarity and hence reflects the absolute value of the error as desired, regardless of the polarity of the difference signal.

According to the present invention, there is provided a circuit for performing this differencing function by means of a technique that is entirely different than the conventional methods and as a result is considerably simplified insofar as the number of components needed is concerned.

More specifically, the present invention employs the technique of translating each of the monitored signals into both direct current and alternating current components, each of which is proportional to that signal, and with both direct current signals being of the same polarity. Thereafter, in a unique manner the direct current component of each signal is combined with the alternating current component of the other to, in effect, displace or shift the amplitude of each of the alternating current signals in the same direction or polarity, with the alternating current component of one signal being displaced by the direct current component of the other signal and the reverse. Since the direct current displacing signals are of the same polarity, one-half cycle of each of the shifted components is found to be proportional to the sum of the two signals and the other half cycle to the error signal or difference thereof. Furthermore, it is found that the two error signals obtained have the same magnitude but different polarities. Consequently, in a final step, a fixed polarity responsive means is employed for receiving both error signals and transmitting only that one of the error signals having the polarity desired whereby the output signal is always of constant polarity, regardless of which of the two input signals has the greater amplitude.

It is, accordingly, a principal object of the invention to provide a differencing circuit having a constant polarity direct current output proportional to the absolute value of the difference between two alternating current signals.

A further object is to provide such a circuit having a minimum number of components.

Another object is to provide such a circuit employing only passive elements.

Other objects, and many additional advantages, will be more readily understood by those skilled in the art after a detailed consideration of the following specification, taken with the accompanying drawings, wherein:

FIG. 1 is an electrical schematic circuit illustration of one preferred embodiment of the invention; and FIGS. 2a to 2f are electrical waveform diagrams illustrating the voltages existing at different portions of the circuit.

Referring now to the drawings, there is shown in FIG. 1, a preferred electrical circuit for performing the desired differencing function to determine the absolute value of the difference in amplitude between a first alternating current signal A applied between input terminal 10 and ground terminal 11 and, a second alternating current signal B applied between input terminal 12 and ground 11, and to producing a direct current output signal between output terminals 13 and 14 having a constant polarity but a variable amplitude proportional to this difference.

As shown, the alternating input signals A applied between terminals 10 and ground 11 is first directed to a clamping circuit, comprising mainly a series connected capacitor 16 and diode 17, and the input signal B is likewise applied to a similar clamping circuit, comprising mainly a series connected capacitor 18 and diode 19. The function provided by each clamping circuit is to translate each of the input signals into two components, consisting of an alternating current component that is substantially identical with that input signal and a direct component that is proportional to the peak amplitude of that input signal, with the two components of input signal A appearing at position C in the circuit and the two components of input signal B appearing at position D in the circuit. The alternating current component obtained from input signal A is thence by-passed by means of a coupling capacitor 20 to a position E in the circuit and there combined with the direct current component obtained from input B, which is transmitted from position D in the circuit to position E through a resistor 21. In a similar manner, the alternating current component obtained from input B at junction D is by-passed through capacitor 22 to position F in the circuit and there combined with the direct current component obtained from the input A and transmitted from position C to position F through a resistor 23. Thus, at position F in the circuit there is obtained a combined signal proportional to the A.-C. component obtained from input signal B and the D.-C. component obtained from input signal A and at position E in the circuit there is obtained a combined signal proportional to the A.-C. component from signal A and the D.-C. component from signal B.

The combination of A.-C. and D.-C. signals at both positions E and F in the circuit is such that during one-half of each cycle of the A.-C. portions, the A.-C. and D.-C. signal components are of the same polarity and hence are additive, whereas during the negative going portion, the A.-C. portion is opposed to the D.-C. portion to provide a resulting value proportional to the difference. Consequently, at both positions E and F, there is obtained the difference or error signal desired; with the error signal at position F being proportional to signal A minus signal B, whereas the error signal at position E is proportional to signal B minus signal A. In other words, at both positions E and F there is obtained the desired error or difference signal between inputs A and B but the error signal at position F is of opposite polarity than that at position E.

To obtain the constant polarity direct current output signal desired or, stated in another way, to select from the two signals appearing at positions E and F only that one error signal having the polarity desired, the error signals at positions E and F are each directed through a diode 24 and 25, respectively, connected in back-to-back relation and having their commonly connected anodes leading to a capacitor 26 whose opposite terminal is grounded. Consequently, whichever of the signals at positions E or F has the greatest negative going potential causes conduction through the related one of diodes 24 and 25 to charge capacitor 26 with a D.-C. potential proportional to the error or difference signal. Since the diodes serve as half wave rectifiers, they insure that the signal charging capacitor 26 always occurs during the negative going half cycles of the A.-C. signal and hence that the charging signal is proportional to the difference between the D.-C. and A.-C. components. Furthermore, since diodes 23 and 24 permit current conduction in only one direction, the capacitor 26 may only be charged in one direction to provide a unidirectional D.-C. output over output line 13 proportional to the desired error or difference signal. Thus, according to the invention, the means for obtaining the absolute value of the difference between two signals may be generally stated as being obtained by first obtaining two error signals, each being proportional to the desired difference but of opposite polarities, and thereafter selecting that one of the two signals having the constant polarity desired.

The capacitor 30 provided in the circuit interconnecting the output line 14 with ground is supplied for the purpose of providing a balanced output circuit. It will be noted that capacitor 30 is effectively in series with capacitor 26 connected to output line 13 whereby the ground potential is introduced at the junction of the two capacitors 26 and 30.

Referring to FIGS. 2a to 2f for a more detailed understanding of the functioning of the clamping circuits for initially translating each of the input signals into combined D.-C. and A.-C. components, let it be first assumed that the input signal A is of the same frequency as input signal B but of greater amplitude, as illustrated by the waveform labeled A in FIG. 2a and the waveform B in FIG. 2d. This assumption is being made only for the purpose of simplifying the explanation and is not required in practice, since the circuit operates equally well whether or not the frequencies of signals A and B are the same.

The application of input signal A produces a current flow during its first negative going half cycle through capacitor 16 and diode 17, serving to charge capacitor 16 with a direct current potential proportional to the peak amplitude G of waveform A (FIG. 2a) and with the polarity indicated in FIG. 1. During the next positive going portion of input signal A, no current may flow through this circuit because of the reversed polarity of rectifier 17 and hence capacitor 16 may not discharge other than by a small amount of leakage permitted by a large resistor 27, paralleling the diode 17. Consequently, during this positive half cycle, the potential across capacitor 16 remains substantially constant and in adding relationship with the input signal A to produce a peak amplitude signal at position C in the circuit of twice the amplitude or 2G of the input signal A. During the succeeding negative going portion of the input signal A, the charge on capacitor 16 is in opposing or bucking relationship with the input signal, and therefore, neglecting any leakage, remains at potential G to prevent any current flow through the circuit whereby the resulting potential at position C becomes progressively lower until reaching zero (at the peak negative position of the input signal A) but cannot pass into the negative region as shown in FIG. 2b, since the amplitude of the input signal never falls below the value of G which is the bucking potential across capacitor 16. Consequently, it is noted by comparing FIGS. 2a and 2b that the charging capacitor 16 functions in the manner of a fixed bias battery or source to displace the waveform A in a positive direction by the substantially exact amount of its peak amplitude.

The second clamping circuit comprising the capacitor 18 and the diode 19 and large resistor 28 function in the same manner as shown in FIGS. 2d and 2e whereby the potential at position D in the circuit is likewise comprised of the A.-C. input signal B that has been positively displaced by the amount of its peak amplitude H by reason of the charge developed on capacitor 18.

The positively displaced signals appearing at positions C and D (FIGS. 2b and 2e) are each basically comprised of an A.-C. component which is substantially identical in amplitude and frequency to the input signal, and a D.-C. component, which as a result of the clamping circuit is proportional to the peak amplitude of the input signal.

The direct current component obtained from input signal A and existing at point C in the circuit is then directed from position C through a resistor 23 to position F, but it cannot pass through a by-pass capacitor 20 to position E in the circuit. Similarly, the direct current component obtained from input signal B and existing at position D in the circuit passes through the resistor 21 to position E but cannot pass through the capacitor 22 to position F. On the other hand, the alternating current component from input signal A and existing at position C passes through the low impedance of the by-pass capacitor 20 to position E rather than through the higher resistance of resistor 23. As a result, the signal appearing at position E in the circuit, and shown in FIG. 2c, is the combination of the direct current component from input signal B and the alternating current component from input signal A. The signal appearing at position F in the circuit is the combination of the direct current component from input signal A and the alternating current component from input signal B.

Observing the waveform E in FIG. 2c and the waveform F in FIG. 2f, it is noted that in both instances one half cycle of each wave is proportional to the sum of the A.-C. and D.-C. components and the other half cycle is proportional to the difference between the D.-C. and A.-C. components or the error signal.

Specifically, in FIG. 2c during the first half cycle, the peak amplitude of the wave is substantially equal to the sum of the peak amplitude G of input signal A and the peak amplitude H of input signal B (amplitude G plus amplitude H) whereas, during the second half cycle, the negative area labeled J represents the difference between the peak amplitude H of input signal B and the peak amplitude G of input signal A. Similarly, observing FIG. 2f, it is noted that the first half cycle of the wave is proportional to the sum of input signal A and input signal B whereas, the second half cycle is proportional to the difference between input signal A and input signal B. Consequently, at both positions E and F in the circuit, there is produced signals during one half cycle proportional to the desired error or difference but of opposite polarities.

Returning to FIG. 1, the signals at positions E and F are each directed to the cathodes of negatively poled diodes 24 and 25 connected in back-to-back relation and having the anode elements of both diodes being connected in common to a capacitor 26 whose opposite terminal is grounded. These diodes are oppositely poled or in opposite polarity from the D.-C. components existing at positions E and F in the circuit and, consequently, will respond only to the negative going half cycles of the signals at positions E and F or, in other words, only to the difference or error portions of these signals. Furthermore, since the error portions of the signals at E and F are of opposite polarities, only one of these signals will have a negative going portion J which in the example given is the signal at position E (input signal B minus input signal A). Consequently, only the diode 25 conducts current in this instance to charge capacitor 26 with a potential proportional to the peak negative amplitude of the signal at position E to produce an output signal over line 13 proportional to the desired error.

It is to be particularly noted that in this example the input signal A has a greater amplitude than input signal B and, consequently, only the error signal at position E in the circuit will have a negative going portion J. On the other hand, if the input signal B were larger than input signal A then the resulting signal at position F would have a negative going portion and pass through diode 24 to charge capacitor 26. Therefore, regardless of which of signals A or B is greater than the other, the circuit functions to provide an error output signal of constant polarity over output line 13 as is desired whereby the circuit provides an absolute differencing function.

What is claimed is:

1. A differencing circuit for obtaining a direct current signal of constant polarity proportional to the absolute value of the difference between two alternating current signals comprising: a first clamping circuit energizable by a first of said alternating current signals, a second clamping circuit energizable by the second of said alternating current signals, each of said clamping circuits producing a resulting signal having alternating current and direct current components, means combining the alternating current components from the first signal and the direct current component from the second signal, means combining the alternating current component from the second signal with the direct current component from the first signal, and polarity responsive means energized by both said combining means and responsive to that one of said combining means producing a signal having the lowest minimum value for producing a direct current output signal of constant polarity proportional to said minimum value.

2. An analog differencing device for producing a direct current signal of constant polarity proportional to the absolute value of the difference between first and second alternating current signals comprising: means for translating said first alternating current signal into a first combined signal and said second alternating signal into a second combined signal, each combined signal having a direct current portion and an alternating current portion, means for adding the alternating current portion from one of said combined signals with the direct current portion from the other to produce a first error signal and adding the alternating current portion from the other combined signal with the direct current portion of said one combined signal to produce a second error signal, and polarity responsive means energized by both error signals and selectively responsive to that one of the first and second error signals having the lowest minimum value to provide a direct current output proportional thereto.

3. An analog computer circuit for obtaining a direct current output signal of constant polarity proportional to the difference between the absolute value of two alternating current signals, comprising means responsive to one of said signals for producing a third signal comprised of a first direct current component proportional to the amplitude of the signal and a first alternating current component proportional to the signal, means responsive to a second of said signals for producing a combined signal comprised of a second direct current component proportional to amplitude of the second signal and a second alternating current component proportional to the second signal, means combining said first direct current component and second alternating current component to produce a third component, means combining said second direct current component and first alternating current component to produce a fourth component, and means energized by said third and fourth components and responsive to that one of said third and fourth components having the smallest average direct current value to provide said direct current output signal.

4. A differencing circuit for obtaining the absolute value of the difference between two alternating current input signals comprising means responsive to each input signal for displacing its amplitude by a direct current component proportional to its peak amplitude to provide a direct current component and alternating current component for each signal, means combining the alternating current component from each signal with the direct current component of the other to provide two error signals, each error signal having an average value of the same polarity, and means responsive to that one of the error signals having the lowest amplitude direct current component for producing a constant polarity output signal proportional to the minimum amplitude of that error signal.

5. In the circuit of claim 4, said means for displacing the amplitude of each input signal comprising a first and second clamping circuit each responsive to a different one of said input signals.

6. In the circuit of claim 5, said clamping circuits each including a series connected capacitor and a diode.

7. In the circuit of claim 6, said combining means comprising a by-pass capacitor for each clamping circuit and having one terminal thereof connected to that clamping circuit, a direct current impedance for each clamping circuit and having one terminal thereof connected to that clamping circuit, and means connecting the remaining terminal of the by-pass capacitor for each clamping circuit to the remaining terminal of the direct current impedance connected to the other clamping circuit.

8. In the circuit of claim 7, said constant polarity output means including half wave rectifier means interconnecting the other terminal of each by-pass capacitor to a common output terminal, with each said rectifying means being poled in the same polarity permitting unidirectional current flow to said common terminal.

9. In the differencing device of claim 2, said adding means including a by-pass capacitor for each of said first and second combined signals, and a resistor for each of said first and second combined signals, means connecting one of said capacitors and one of said resistors in series, said first combined signal to said second combined signals, and means connecting the remaining resistor and the remaining capacitor in series from said first combined signal to the second combined signal whereby at the junctions of said series circuits there is obtained said error signals.

References Cited in the file of this patent
UNITED STATES PATENTS

| | | |
|---|---|---|
| 2,900,501 | Monberg | Aug. 18, 1959 |
| 2,924,709 | Morrill | Feb. 9, 1960 |
| 3,013,151 | Adams et al. | Dec. 12, 1961 |
| 3,031,142 | Cohen et al. | Apr. 24, 1962 |